K. A. SIMMON.
HORIZONTAL STEERING GEAR FOR TORPEDOES.
APPLICATION FILED APR. 18, 1919.
1,360,325.
Patented Nov. 30, 1920.
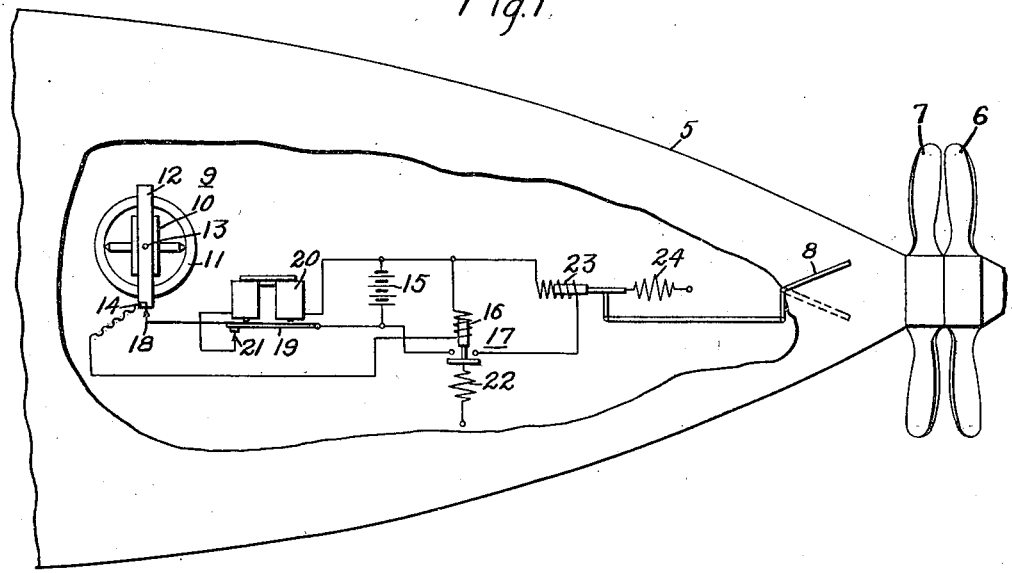
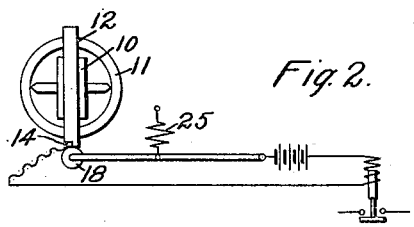
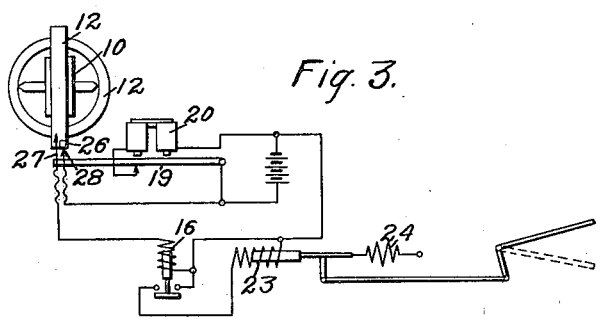
WITNESSES:
J. A. Helsel.
D. C. Davis
INVENTOR
Karl A. Simmon.
BY
Wesley G. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

HORIZONTAL STEERING-GEAR FOR TORPEDOES.

1,360,325.  Specification of Letters Patent.  Patented Nov. 30, 1920.

Application filed April 18, 1919. Serial No. 291,038.

*To all whom it may concern:*

Be it known that I, KARL A. SIMMON, a citizen of the United States, and a resident of Edgewood Park, in the county of Allegheny and State of Pennsylvania, have invented a new and useful Improvement in Horizontal Steering-Gears for Torpedoes, of which the following is a specification.

My invention relates to such gyroscopic steering systems as are employed in self-propelled torpedoes and similar installations, and it has for its object to provide a system of the character designated that shall be simple and rugged in construction and particularly sensitive and accurate in operation, as substantially no disturbing or precessing effect is imparted to the gyroscope throughout the entire range of travel of the torpedo or other automotive body.

A further object of my invention is to effect the control of a torpedo by improved means for alternately moving the rudder, first in one direction and then in the other, in such a way that the rudder movements shall be sensitive to the slightest movement of the gyroscope or other controlling device.

In the accompanying drawing, Figure 1 is a plan view of the after-body of a torpedo with a diagrammatic showing of a steering system embodying my invention; and Figs. 2 and 3 are diagrammatic views of modifications of a portion of the system shown in Fig. 1.

In the use of self-propelled torpedoes and similar devices, it is essential that a steering or directive impulse be imparted to the torpedo when fired that shall persist without substantial modification until the target is reached. This initial directive effect is generally imparted by a gyroscope mounted within the torpedo, and the gyroscope is then so arranged as to impart a corrective steering impulse to the torpedo upon a predetermined deviation thereof from the predetermined course.

The derivation of a steering impulse from the gyroscope has, in the past, generally occasioned the imparting of a slight mechanical blow or pressure thereto, resulting in the precession of the gyroscope and consequent impairment of the initial directive impulse.

By my invention, I mount a contact member on the gyroscope frame and an opposing contact member on the body of the torpedo, the latter contact member being provided with means for continuously vibrating the same toward and away from the center of mass of the rotating body of the gyroscope. Thus, during a major portion of the time, the two contact members are out of contact with each other and may have relative lateral movement without developing friction, as occurs during yawing of the torpedo. The periodic impact of the vibrating member with the gyroscope member closes a circuit, however, that develops the desired corrective steering impulses, all in a manner that will hereinafter be pointed out.

Referring to the drawing for a more detailed understanding of my invention, I show the after-body of a torpedo at 5, being provided with the usual oppositely-rotating propellers 6 and 7 and with a horizontal steering rudder 8.

A gyroscope 9 is provided for the steering control of the torpedo and embodies the usual heavy rotating wheel 10 universally mounted in gimbal rings 11 and 12, the latter being mounted for rotation about a vertical axis 13. When the torpedo yaws, the entire torpedo structure moves, relatively to the gyroscope structure, about the axis 13.

A small insulated conducting member 14 is mounted on the outer gimbal ring 12 at the side thereof and is connected to one pole of a suitable current source 15 through the energizing coil 16 of a relay 17. A contact member 18 is mounted in front of the contact member 14 and moves transversely over the face of said contact member and the face of the adjacent portion of the ring 12 upon relative rotation of the torpedo body about the axis 13. The contact member 18 is mounted on the armature 19 of a vibrating electromagnet 20 and is connected to the second pole of the source 15. The contact member 18 is connected also to the first pole of the source 15 through the coils of the magnet 20 and through a make-and-break contact 21 on the armature 19, so that the armature 19 is continuously vibrated and the contact member 18 continuously taps the contact member 14 and the adjacent portions of the ring 12.

The relay 17 is normally biased to the open position, either by gravity or by a spring 22, and controls the circuit to a powerful steering solenoid 23, mounted to oppose a heavy biasing spring 24 and to actuate the rudder 8.

The direction of impact of the contact member 18 is always toward the center of mass of the gyroscope system so that, when impacting thereupon, no twisting or turning movement is imparted to the gyroscope system.

The relay 17 may be relatively sluggish in action so that it remains in the closed position throughout the period when the member 18 is tapping upon the member 13.

Having thus described the arrangement of a system embodying my invention, the operation thereof is as follows. At the outset of the torpedo's travel, the gyroscope 9 is caused to rapidly revolve and the circuits from the current source 15 are closed. The normal action of the spring 24 is to throw the rudder 8 to the right, thus causing the torpedo to yaw toward the right. This causes the contact member 18 to come over the contact plate 14 on the ring 12 and causes the rapid opening and closing of an energizing circuit through the coil 16. The relay 17 is accordingly closed and the solenoid 23 is energized, the resultant force being sufficient to preponderate over the spring 24 and to throw the rudder 8 to the left, causing the torpedo to return to her course.

After the torpedo has yawed sufficiently to the left, the contact member 15 commences to tap upon the ring 12 rather than upon the contact plate 14, and the energizing circuit for the coil 16 is, therefore, broken. The consequent deënergization of the solenoid 23 permits the spring 24 to again come into action, again throwing the rudder to the right and permitting the torpedo to yaw toward the right, as before. This action is repeated an indefinite number of times until the target is reached or until the propelling energy is expended.

Particular attention is directed to the fact that, by virtue of the direction of the blow delivered by the contact member 18 through the gyroscope system, no twisting or precessing effect is produced therein and, as the major portion of the relative transverse motion between the contact member 18 and the ring 12 occurs when the contact member 18 is out of contact therewith, there is substantially no frictional engagement between these members, with consequent precession of the gyroscope. For all of these reasons, the gyroscope maintains its true axis of rotation throughout the entire travel of the torpedo, and an exceptionally accurate steering control is afforded.

Referring to the form of my invention shown in Fig. 2, the ring 12 is provided with a contact plate 14, as before, but the contact member 18 takes the form of a substantially frictionless roller held in continuous engagement with the ring 12, as by a spring 25. This form of control, while sufficiently sensitive for some types of torpedoes, as for short-range work and for practice, nevertheless, embodies considerably more precession than does the device of Fig. 1 and should not, therefore, be used where extreme accuracy is desired.

Substantially the sole disturbing factor in the gyroscope system of Fig. 1 is the stiffness of the flexible conductor to the contact member 14. I may remove this disturbing element and thus secure an extremely refined control by employing the system shown in Fig. 3. The ring 12 is provided with a portion of its surface insulated, as shown at 26 and the armature 19 of the magnet 20 carries two contact members 27 and 28 that are adapted to be vibrated continuously into and out of contact with the face of the ring 12. The contact member 27 is so disposed as to tap directly upon the contacting face of the ring 12, irrespective of the degree of yaw of the torpedo in either direction but the contact member 28 is disposed to contact with the insulating portion 26 upon yawing toward the left. Contact members 27 and 28 are both slightly resilient in nature so as to insure good electrical contact of each thereof with the face of the ring 12 when vibrated thereagainst.

The operation of the apparatus thus described will be obvious. Upon yawing toward the left, the contact member 28 bears upon the insulating plate 26 and the circuit to the coil 16 is opened. Thus, the spring 24 throws the rudder to the right and yaws the torpedo in that direction. The contact members 27 and 28 are soon both brought into contact with conducting portions of the face of the ring 12 so as to close a circuit to the relay 16, energizing the solenoid 23 and throwing the rudder toward the left, directing the torpedo in this direction.

Thus, in the structure of Fig. 3, all electrical impulses are transmitted to the gyroscope frame by tapping and thus the effects of flexible leads and friction engagement are entirely done away with.

While I have shown and described my invention in three forms, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a circuit-controlling structure, the combination with two conducting members subject to relative transverse movement, of means whereby one of said members is caused to continuously tap the other for the closure of a circuit, the contact-periods being brief enough to substantially prevent the transverse motion of one member from being imparted to the other.

2. In a circuit-controlling structure, the combination with a substantially flat member embodying a conducting area and an area insulated therefrom, a contact member continuously vibrated into and out of contact with said flat member, a circuit including a current source and a translating device connected to said contact member and said conducting area, respectively, said flat member and said contact member being subject to relative transverse movement whereby said contact member is caused at times to impinge upon said conducting area and to close said circuit and to impinge, at other times, upon said insulating area, and the contact-periods being brief enough to substantially prevent the transverse motion of one member from being imparted to the other.

3. In mechanism for deriving a controlling impulse from a gyroscope without precession thereof, the combination with a conducting member and an adjacent insulated member upon the gyroscope frame, of a contact member mounted adjacent thereto and subject to relative transverse movement over the faces of said conducting and insulated members, means for continuously vibrating said contact member into and out of contact with said gyroscope members, and a circuit connected to said conducting member and said contact member, respectively, and including a current source and an energy translating device.

4. In mechanism for deriving a controlling impulse from a gyroscope without precession thereof, the combination with a conducting member and an adjacent insulated member upon the gyroscope frame, of a contact member mounted adjacent thereto and subject to relative transverse movement over the faces of said conducting and said insulated members, means for continuously vibrating said contact member into and out of contact with said gyroscope members, a circuit connected to said conducting member and said contact member, respectively, and including a current source and an energy translating device of relatively slow action, whereby said translating device maintains its energized position throughout the vibration of said contact member upon said conducting member, and an additional energy translating device subject to the action of said first translating device.

5. In a gyroscopic steering system for automotive bodies, the combination with a gyroscope frame bearing a conducting member and an adjacent insulated member, of a contact member mounted on said body and subject to movement across the faces of said members during the yawing of said body, means for continuously vibrating said contact member into and out of contact with the immediately adjacent gyroscope member, a circuit including a current source and an energy translating device connected to said conducting member and said contact member, respectively, whereby said circuit is closed when said contact member is vibrating upon said conducting member, and means whereby said translating device imparts a steering impulse to said automotive body.

6. In a gyroscopic steering system for automotive bodies, the combination with a gyroscope frame bearing a conducting member and an adjacent insulated member, of a contact member mounted on said body and subject to movement across the faces of said members during the yawing of said body, means for continuously vibrating said contact member into and out of contact with the immediately adjacent gyroscope member, a circuit including a current source and an energy translating device connected to said conducting member and said contact member, respectively, whereby said circuit is closed when said contact member is vibrating upon said conducting member, said translating means being relatively slow-acting, whereby it maintains the energized position during the vibration of said contact member upon said conducting member, and means whereby said translating device imparts a steering impulse to said automotive body when energized.

7. In a gyroscopic steering system for automotive bodies, the combination with a gyroscope frame bearing a conducting member and an adjacent insulated member, of a contact member mounted on said body and subject to movement across the faces of said members during the yawing of said body, means for continuously vibrating said contact member into and out of contact with the immediately adjacent gyroscope member, a circuit including a current source and a relay connected to said contact member and to said conducting member, respectively, whereby said circuit is closed when said contact member is vibrating upon said conducting member, said relay being relatively slow-acting, whereby it maintains its energized position during the vibration of said contact member upon said conducting member, and a steering circuit subject to the control of said relay.

8. In a gyroscopic steering system for automotive bodies, the combination with a rudder, of means for normally biasing the position of said ruddder to one side, a gyroscope carried by said body and bearing adjacent conducting and insulated bodies, a contact member arranged to travel across the faces of said gyroscope members during the yawing of said body, means for continuously vibrating said contact member into and out of engagement with the immediately adjacent gyroscope member, the arrangement being such that the yawing produced by said biasing means positions said contact member over said conducting member, a circuit including a current source and an energy translating device connected to said contact member and said conducting member, respectively, and means whereby the attendant energization of said circuit develops such preponderating steering force as to overcome said biasing means and to throw the rudder to the other side.

9. In a steering mechanism for an automotive body, the combination with a steering member for causing said body to alter its course, of yielding means normally biasing said steering member in one direction, actuating means operative to overcome said yielding means and move said steering member in the opposite direction, and a controlling device for said actuating means for keeping said automotive body in a predetermined course.

10. In a steering mechanism for an automotive body, the combination with a steering member for causing said body to alter its course, of yielding means normally biasing said steering member in one direction, electrically-controlled actuating means operative to overcome said yielding means and move said steering member in the opposite direction, and circuit-closing means responsive to deviations of said body from a predetermined course for causing the energization of said actuating means.

In testimony whereof, I have hereunto subscribed my name this 31st day of March 1919.

KARL A. SIMMON.